US00RE38744E

(19) United States
(12) Reissued Patent
Oldendorf et al.

(10) Patent Number: US RE38,744 E
(45) Date of Reissued Patent: Jun. 21, 2005

(54) ELECTRIC BALANCE FOR CORRECTING MISLOADING THEREOF

(75) Inventors: Christian Oldendorf, Goettingen (DE); Franz-Josef Melcher, deceased, late of Hardegsen (DE); by Rudolf Koehler, legal representative, Goettingen (DE); Christoph Berg, Goettingen (DE)

(73) Assignee: Sartorius AG, Göttingen (DE)

(21) Appl. No.: 09/850,113

(22) Filed: May 8, 2001

Related U.S. Patent Documents

Reissue of:
(64) Patent No.: 5,902,965
Issued: May 11, 1999
Appl. No.: 09/019,712
Filed: Feb. 6, 1998

U.S. Applications:

(63) Continuation of application No. 08/397,958, filed on Mar. 3, 1995, now Pat. No. 5,847,328.

(30) Foreign Application Priority Data

Mar. 5, 1994 (DE) ..... 44 07 433

(51) Int. Cl.[7] ..... G01G 23/14; G01G 23/26
(52) U.S. Cl. ..... 177/25.11; 177/25.16; 177/25.19; 141/83
(58) Field of Search ..... 177/25.11, 25.12, 177/25.13, 25.14, 25.15, 25.16, 25.17, 25.19; 141/83

(56) References Cited

U.S. PATENT DOCUMENTS 4,650,014 A 3/1987 Oldendorf et al. ..... 177/177
4,840,239 A 6/1989 Slagg ..... 177/25.14
4,911,256 A 3/1990 Attikiouzel ..... 177/25.16
5,544,684 A 8/1996 Robinette, III ..... 141/83
5,847,328 A 12/1998 Oldendorf et al. ..... 177/25.11

FOREIGN PATENT DOCUMENTS

DD 265 229 A1 2/1989

*Primary Examiner*—Randy W. Gibson
(74) *Attorney, Agent, or Firm*—Sughrue Mion, PLLC

(57) ABSTRACT

In an electronic balance for loading having a balance scale (3) weighing system, display (19), control keyboard (21 to 26) and a digital processing electronic circuitry in which circuitry at least one memory is present for the weighed value shown in the display (19). A first additional key (25) is present in the control keyboard (21 to 26) upon the actuation of the key the weighed value shown in the display (19) and stored in the digital signal processing electronics is decreased and upon the first actuation of the key the weighed value displayed immediately previously is taken in addition into a first additional memory. Furthermore, a second additional key (24) is present in the control keyboard (21 to 26) upon whose actuation the weighed value displayed in the display (19) is taken into a second additional memory. By means of the decreasing key the balance operator can decreased the display from the too large actual value step-by-step to the correct theoretical value. Since the overload is generally only a few numerical steps of the balance display, this is achieved with a few steps. The balance can calculate the percentage overload by storing the balance display prior to the decreasing and during the conclusion of the decreasing and subsequently bring about the same overloading in the known manner for each of the remaining components. This creates the possibility even for simple loading balances without an electronic recipe memory of compensating an inadvertent overloading of a component by means of a overloading of the other components in equal percentage.

11 Claims, 4 Drawing Sheets

ELECTRIC BALANCE FOR CORRECTING MISLOADING THEREOF

Matter enclosed in heavy brackets [ ] appears in the original patent but forms no part of this reissue specification; matter printed in italics indicates the additions made by reissue.

This application is a continuation of Ser. No. 08/397,958, filed Mar. 3, 1995, now U.S. Pat. No. 5,847,328.

The invention relates to an electronic balance for loading, having a balance scale, weighing system, display, control keyboard and a digital processing electronic circuitry in which circuitry at least one memory is present for the weighed value shown in the display.

BACKGROUND OF THE INVENTION

Balances of the type with which the present invention is concerned are generally known and are described e.g. in DD 265 229.

A disadvantage of the known balances is the fact that when loading a balance with a formulation an inadvertent overloading of a component is difficult to cancel. In general, the attempt is made in this instance to retrieve the overloaded portion of the mixing vessel. Which, however, works somewhat only in the case of granular components but becomes difficult in the case of viscous components and is virtually totally impossible in the case of liquid-like components, which mix very rapidly. In addition, there is the danger in all cases that previous components are inadvertently removed also, which completely adulterates the formulation and, when the removed substance is reused, for instance, the next formulation is adulterated. In order to avoid this problem large, computer-supported loading systems have the possibility of rectifying overloads by also overloading the other components in the same proportion to maintain appropriate proportions. To this end the balance or the thereto connected computer calculates the percentage of overloading and alters the sensitivity of the balance for the following components in such a manner that the given mixing ratio is continuously observed and only the total amount resultant is somewhat higher. The components before the overload must naturally be subsequently dosed. However, a prerequisite of this method is that the balance or the computer knows both the theoretical weight as well as the loaded actual weight and can calculate the percentage overloading therefrom. However, this prerequisite is not given in the case of simple balances without an appropriate connection to a computer and without a recipe or formulation memory inside the balance.

The balance in DD 265 229 solves the problem of overloading by means of a memory with associated assumption key, associated zeroizing key and associated tare display unit for each component of the formulation. Therefore the actual value of each component can be individually stored and displayed and as a result an overloading of a component can be rectified or corrected by a corresponding, appropriate overloading of the other component. However, the plurality of operating keys and displays renders the balance complex i.e. difficult to read, difficult to operate and expensive to manufacture. In spite of the considerable expense such a balance is not capable of calculating the amount of material of the components to be subsequently added, which has to be done manually with external calculating aids, which readily lead to errors.

The present invention has the object of creating a possibility also for simple loading balances without electronic formulation or recipe memory of compensating an inadvertent overloading of a component by means of an equivalent percentage overloading of the remaining components.

The present invention achieves this in that a first additional key is present in the central keyboard upon the actuation of which key the weighed value shown in the display and stored in the digital signal processing electronics is decreased and upon the first actuation of which key the weighed value displayed immediately previously is taken in addition into a first additional memory within the signal processing circuitry, that a second additional key is present upon its actuation the weighed value displayed in the display is taken into a second additional memory within the signal processing circuitry and that the digital signal processing circuitry calculates the percentage deviation from the difference of the values stored in the two additional memories relative to the value in the second additional memory and alters the sensitivity of the balance for the remaining to-be-added components by this percentage.

The balance operator can decrease the display from the too large actual value step-by-step to the correct theoretical value with the decrease key. Since the overloading is generally only a few numerical steps of the balance display, this can be achieved relatively easily with a few steps. As a result of storing the balance display prior to the decreasing and at the conclusion of the decreasing the balance can calculate the percentage overloading and subsequently bring about the identical overloading with regard to the remaining components in a known manner.

BRIEF DESCRIPTION OF THE INVENTION

The invention is described in the following using the schematic figures and the course of its operation is explained thereby.

Figure 1:
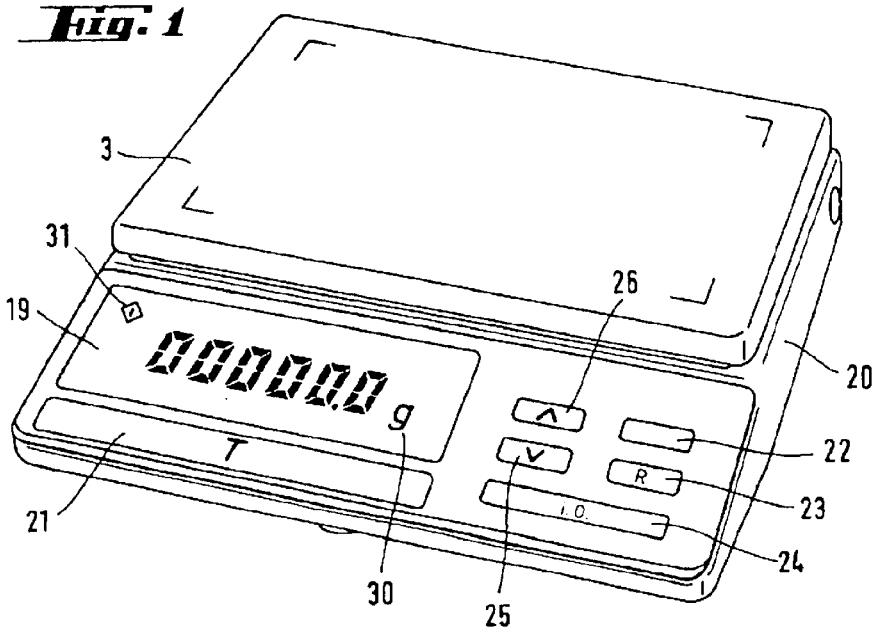
FIG. 1 shows a perspective external view of the balance.

The balance in FIG. 1 consists of a housing 20, balance scale 3 for receiving the material to be weighed, display 19 for showing the measured results and for operator guidance, as well as of several operating keys 21 to 26. Key 21 serves for zeroizing the display (tareing). Keys 22 to 26 are explained further below in the description of the dosing process.

Figure 2:
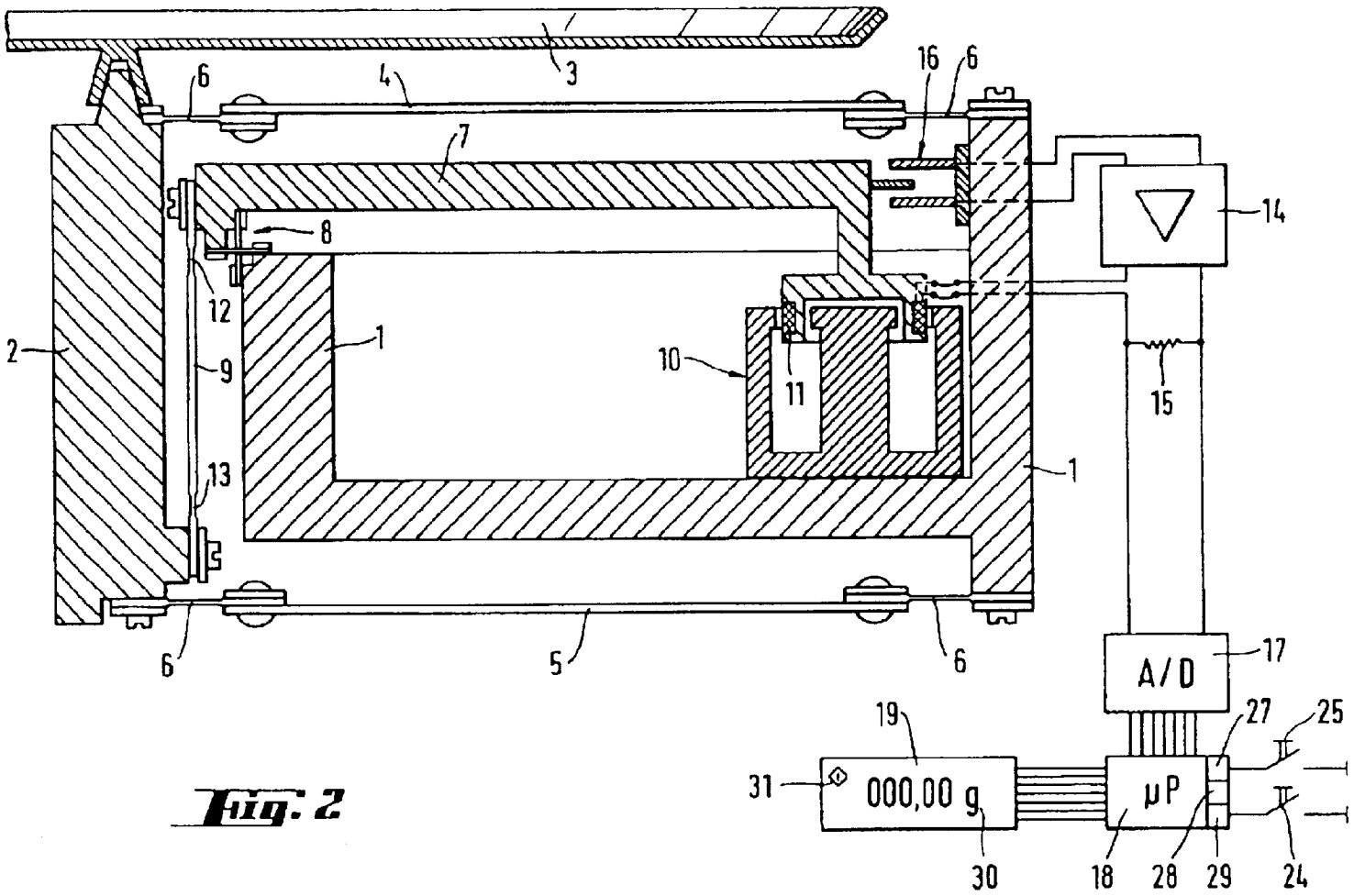
FIG. 2 shows a section through be mechanism of the balance and a block circuit diagram of the electronic circuitry.
Figure 4A:
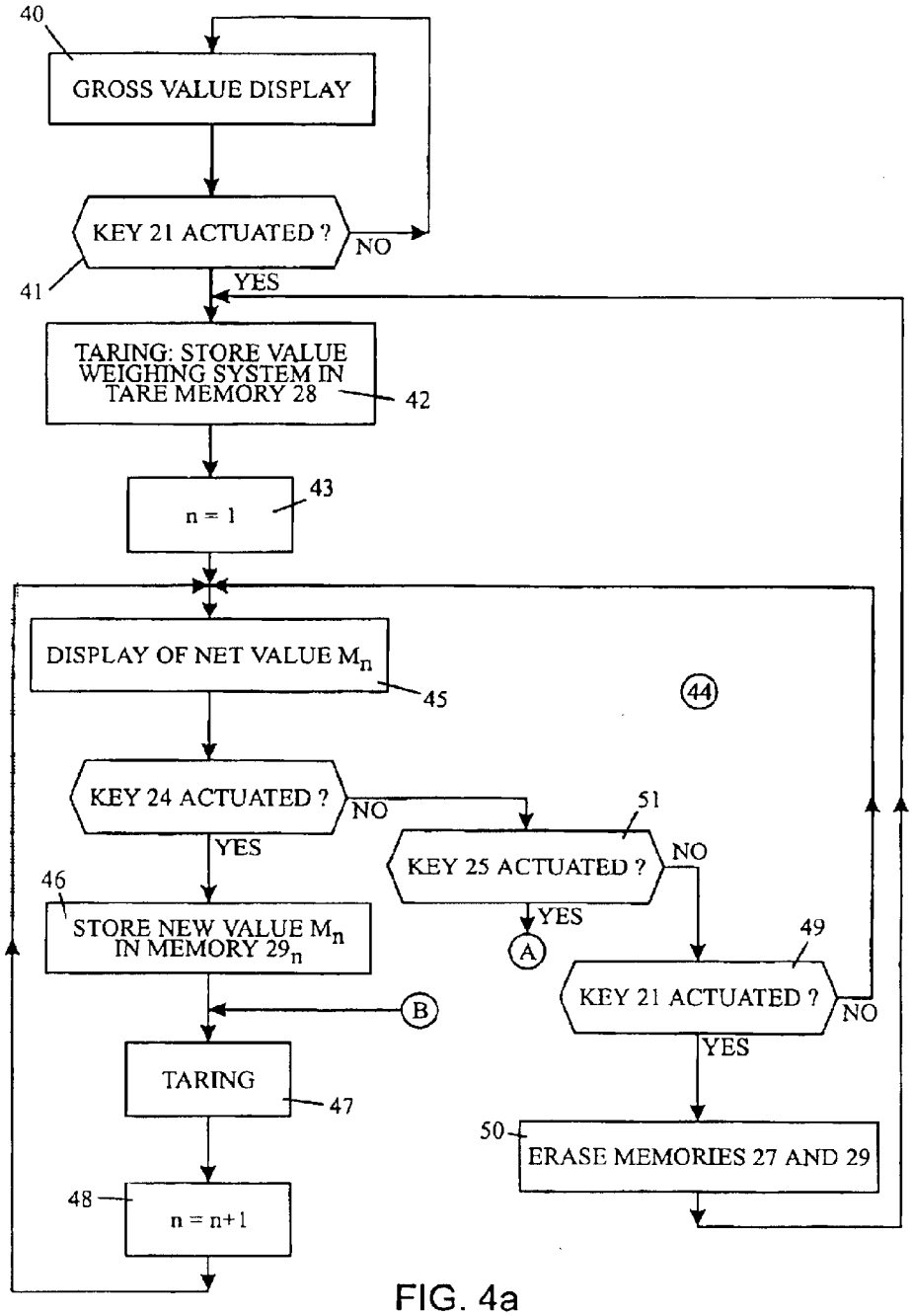
FIGS. 4a and 4b show a flow chart of the course of a dosing.
Figure 4B:
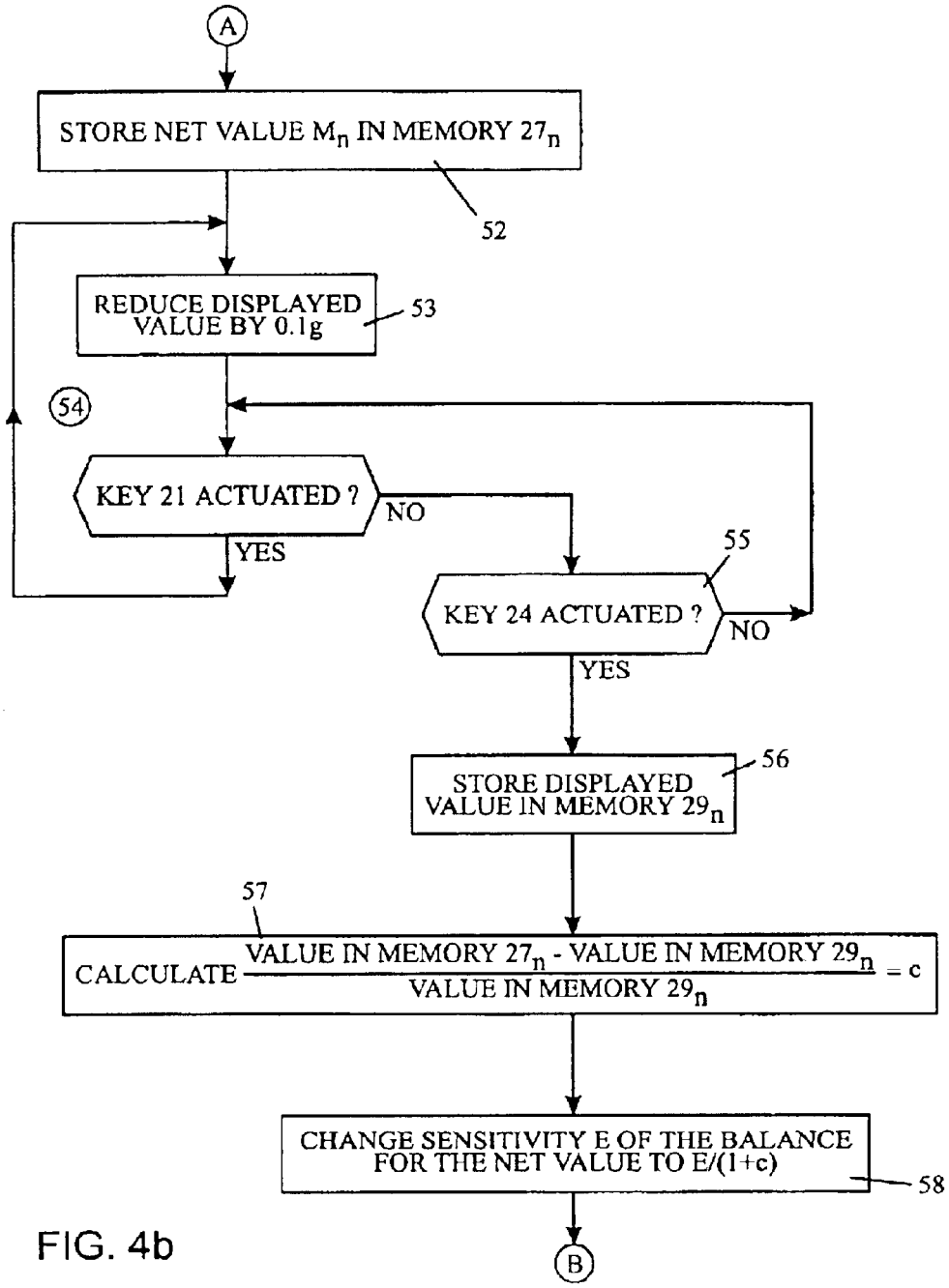

FIG. 2 shows a section through the weighing system in an exemplary embodiment and a block circuit diagram of the associated electronics circuitry. Balance housing 20 and the voltage supply of the electronic circuitry have been omitted for the sake of clarity.

The weighing system consists of a system carrier 1 fixed to the housing, to which carrier load receiver 2 is operably secured so that it can move vertically via two guide rods 4, 5 with moving joints 6. Load receiver 2 carries load scale 3 for receiving the material to be weighed in its upper part and transfers the force corresponding to the mass of the material to be weighed via coupling element 9 with relatively thin areas 12, 13 onto the load arm of translation lever 7. Translation lever 7 is mounted by cross spring joint 8 to system carrier 1. A coil body with coil 11 is fastened to the compensation arm of translation lever 7. Coil 11 is located in the air gap of permanent magnet system 10 and generates the compensation force. The magnitude of the compensation current through coil 11 is regulated thereby in a known manner by position sensor 16 and automatic gain control amplifier 14 in such a manner that equilibrium prevails between the weight of the material to be weighed and the electromagnetically generated compensation force. The compensation current generates a measurable voltage on measuring resistor 15 which voltage is supplied to analogue-to-digital converter 17. The digitized result is assumed by digital signal processing electronics 18 and digitally displayed in display 19.

Balances of this type are generally known both as regards their construction and their operation, so that a detailed description can be eliminated.

Several memory areas are present within the framework of digital signal processing electronics 18 of which memory areas 27, 28 and 29 are shown by way of example in FIG. 2. Of the various operating keys 21 to 26 only the two keys 24, 25 are shown in FIG. 2 for the sake of clarity; the other keys are connected in the same manner to digital signal processing electronics 18. The cooperation of the various keys and memory areas during loading is explained in the following.

The loading takes place in the following steps:

1. The empty container is placed on the balance scale.

2. Tare key 21 is actuated, wherewith display 19 is set to zero.

3. The first component is located to the weight indicated in the formulation and the loading concluded by actuating key 24. This stores the actual value displayed in balance display 19 as the correct value corresponding to the theoretical value in memory area 29. Depending on the makeup of the formulation display 19 is set back at the same time thereby to 0.0. If the theoretical weights are individually recited in the formulation or if the sum of the components is indicated in the formulation display 19 remains unchanged.

4. Then the second components is loaded in and the conclusion is again actuated by key 24. The correct value of the second component is also stored in memory area 29.

5. Then the third and all further components are loaded in a similar manner. If no loading error occurs for any of these components the formulation is concluded. The values stored in memory area 29 are cancelled, when an empty container is subsequently put on the scale, by means of the actuation of tare key 21.

Figure 3:
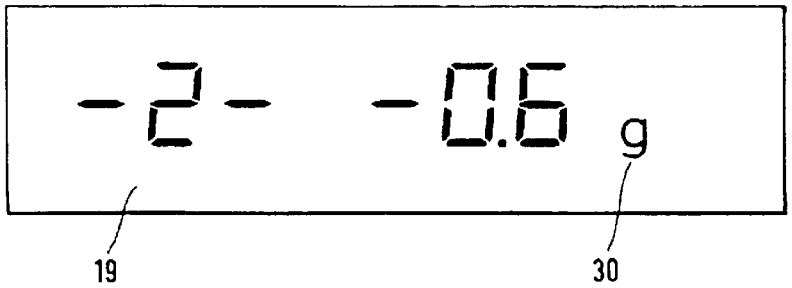
FIG. 3 shows the balance display during the subsequent loading of a second component.

If in the process just described e.g. too much is inadvertently loaded in the case of the third component, e.g. 125.4 instead of 125.0 g, the operator actuates key 25 for decreasing. As a result thereof on the one hand the current actual value of 125.4 g is taken into memory area 27 and on the other hand the displayed value in display 19 is decreased by one numerical step to 125.3. Display 19 is brought to value 125.0 by pressing key 25 three times more and this value is confirmed as the correct value by actuating key 24. Signal processing circuitry 18 can calculate the percentage deviation (+0.32% in the example) from the difference of the actual value stored in memory area 27 from the theoretical value stored in memory area 29 (0.4 g in the example) and divide the net balance display by the factor 1.032 for the following components so that the following components are automatically loaded by 0.32% too much relative to the formulation so that the relative mixing proportions of the third and of the following components agree. (In order to display this change of the sensitivity of the balance, gram symbol 30 goes out in display 19 and/or additional symbol 27 is triggered and displayed). After the loading of the last component the correction process is started by actuating key 23 in which the components not yet overloaded in the correct proportion must be subsequently loaded thereon. In the given example of the incorrect loading of the third component over that of the two first components. The balance calculates thereby the missing amount for the overloading of 0.32% and displays it in the display as a negative value. (Shown as a lacking 0.6 g in FIG. 3 as example for the second component.) The operator must then load in up to the display of 0.0 g and confirm this by actuating key 24. The balance then shows the number of the next component and the lacking amount and confirms the conclusion of the correction e.g. by the displaying of "OK" after the lost component to be subsequently loaded.

Key 26 serves to increment the value in display 19 and serves especially to be able to cancel an inadvertent dropping below the correct theoretical value in the display by too frequent an actuation of decreasing key 25. Key 22 can be engaged, depending on the application, and control e.g. a printer.

The mathematical details for the program run in signal processing electronics 18 are not explained in the above as then can be readily worked out by any programming expert.

We claim:

1. An electronic balance for weighing out quantities of ingredients based upon a recipe of ingredients comprising;

an ingredient weighing container positioned on said balance;

electronic storage memory for the weight of a first ingredient in said weighing container;

electronic storage memory for the weight of a second ingredient in said weighing container;

electronic means to subtract the weight of the second ingredient called for in said recipe from the weight of the second ingredient in said weighing container;

means to determine the ratio of the weights of said ingredients called for in said recipe;

display means to show the amount of said first ingredient need to establish said ratio.

*2. An electronic balance for mixing a plurality of components according to a formula, comprising:*

*a weighing container, which receives the components to be mixed;*

*an electronic evaluation unit, including a recalculation mode for calculation of a quantity to be added for a component in the formula based on an overfill of a quantity of another component in the formula;*

*a display that displays a value of a quantity of a component presently added to the weighing container; and*

*a key that when operated decrements the displayed value of the quantity of the presently added component.*

*3. The electronic balance according to claim 2, wherein the recalculation mode calculates a supplemental quantity to be added to an existing quantity of a previously added component, the supplemental quantity being necessitated by an overfill quantity of the presently added component, and wherein the key is operated to decrement the displayed value of the quantity of the presently added component by the overfill quantity of the presently added component.*

*4. The electronic balance according to claim 3, wherein, the recalculation mode calculates the required supplemental quantity to be added to the existing quantity of the previously added component based on the overfill quantity of the presently added component as determined by the operation*

*of the key to decrement the displayed value by the overfill quantity of the presently added component.*

*5. The electronic balance according to claim 2, wherein the recalculation mode calculates a required adjustment to a quantity of a component to be subsequently added as a result of an overfill quantity of a presently added component, and wherein the key is operated to decrement the displayed value of the quantity of the presently added component by the overfill quantity of the presently added component.*

*6. The electronic balance according to claim 5, wherein the recalculation mode calculates a supplemental quantity to be added to an existing quantity of a previously added component, based on the overfill quantity of the presently added component as determined by the operation of the key to decrement the displayed value by the overfill quantity of the presently added component.*

*7. The electronic balance according to claim 2, wherein the recalculation mode is based on a relationship;*

$$m_{1\ new}/m_{1\ formula}=m_{2\ action}/m_{2\ formula},$$

*wherein* $m_{1\ formula}$ *is a formula weight of a first component;* $m_{1\ new}$ *is a recalculated weight of the first component based on an overfill quantity of a second component in the formula;* $m_{2\ formula}$ *is a formula weight of the second component; and* $m_{2\ actual}$ *is the formula weight of the second component plus the overfill weight of the second component.*

*8. The electronic balance according to claim 2, wherein the weighing container is a platform.*

*9. The electronic balance according to claim 2, further comprising:*

*a first electronic storage memory for a weight of a first component in the weighing container, and*

*a second electronic storage memory for a weight of a second component in the weighing container.*

*10. An electronic balance for weighing out quantities of ingredients based upon a recipe of ingredients, comprising:*

*an ingredient weighing container positioned on the balance;*

*electronic storage memory for the weight of a first ingredient in the weighing container;*

*electronic storage memory for the weight of a second ingredient in the weighing container;*

*means to determine a ratio of the weights of the ingredients called for in the recipe; and*

*display means to show an amount of the first ingredient needed to establish the ratio.*

*11. An electronic balance for weighing out quantities of ingredients based upon a recipe of ingredients, comprising:*

*an ingredient weighing container positioned on the balance;*

*electronic storage memory for the weight of a first ingredient in the weighing container;*

*electronic storage memory for the weight of a second ingredient in the weighing container;*

*electronics that determine a ratio of the weights of the ingredients called for in the recipe; and*

*a display that shows an amount of the first ingredient needed to establish the ratio.*

* * * * *